United States Patent [19]
Thakor et al.

[11] Patent Number: 5,846,471
[45] Date of Patent: Dec. 8, 1998

[54] METHOD FOR MANUFACTURING A TAMPER-EVIDENT CLOSURE

[75] Inventors: Paresh Thakor, Lititz; Mark R. Fricke, Lancaster, both of Pa.

[73] Assignee: Kerr Group, Inc., Lancaster, Pa.

[21] Appl. No.: 829,965

[22] Filed: Apr. 1, 1997

[51] Int. Cl.⁶ .................................................. B28B 7/20
[52] U.S. Cl. .......................................... 264/296; 264/318
[58] Field of Search ..................................... 264/296, 318

[56] References Cited

U.S. PATENT DOCUMENTS

| | | | |
|---|---|---|---|
| 4,155,698 | 5/1979 | Aichinger | 425/556 |
| 4,506,795 | 3/1985 | Herr | 215/252 |
| 4,564,112 | 1/1986 | Breuer | 215/246 |
| 4,595,110 | 6/1986 | Herr | 215/252 |
| 4,595,547 | 6/1986 | Herr | 264/154 |
| 4,748,735 | 6/1988 | Hayes | 29/453 |
| 5,086,938 | 2/1992 | Aichinger | 215/252 |
| 5,205,426 | 4/1993 | McBride et al. | 215/252 |
| 5,219,507 | 6/1993 | Ingram et al. | 264/295 |
| 5,383,780 | 1/1995 | McCready et al. | 425/552 |
| 5,648,037 | 7/1997 | Franchet et al. | 264/296 |

Primary Examiner—Christopher A. Fiorilla
Attorney, Agent, or Firm—Kenyon & Kenyon

[57] ABSTRACT

A method for molding a tamper-evident closure with tabs that extend radially inward and upward. In order to produce tabs with such a configuration, the present invention employs a tab forming element having a mold surface with an inclination corresponding to the degree to which the tabs are desired to extend radially inward and upward. After the tabs have been molded in their inclined position, they are withdrawn from the mold, temporarily altering their angle of inclination. After removal of the closure from the a first portion of the mold, the tabs are returned to the original angle of inclination through contact with a second portion of the mold.

12 Claims, 10 Drawing Sheets

METHOD FOR MANUFACTURING A TAMPER-EVIDENT CLOSURE

BACKGROUND INFORMATION

The present invention is directed to a method and apparatus for manufacturing a tamper-evident closure, and in particular, to a method and apparatus for manufacturing a tamper-evident closure having a plurality of tabs that are molded in their final position to extend radially inward and upward.

A typical tamper-evident closure comprises an internally threaded cap for engaging an externally threaded neck of a container, and a tamper-indicating assembly that is detachably connected to the bottom annular portion of the cap. When the cap is unscrewed from the container neck, the tamper-indicating assembly becomes detached from the cap and remains on the container neck so that, when the cap is replaced on the container neck, a discernible gap formed between the cap and the tamper-indicating assembly serves as a visual indication that the container has been previously opened. An example of such a typical tamper-evident closure is illustrated in FIGS. 1–3.

Figure 1:
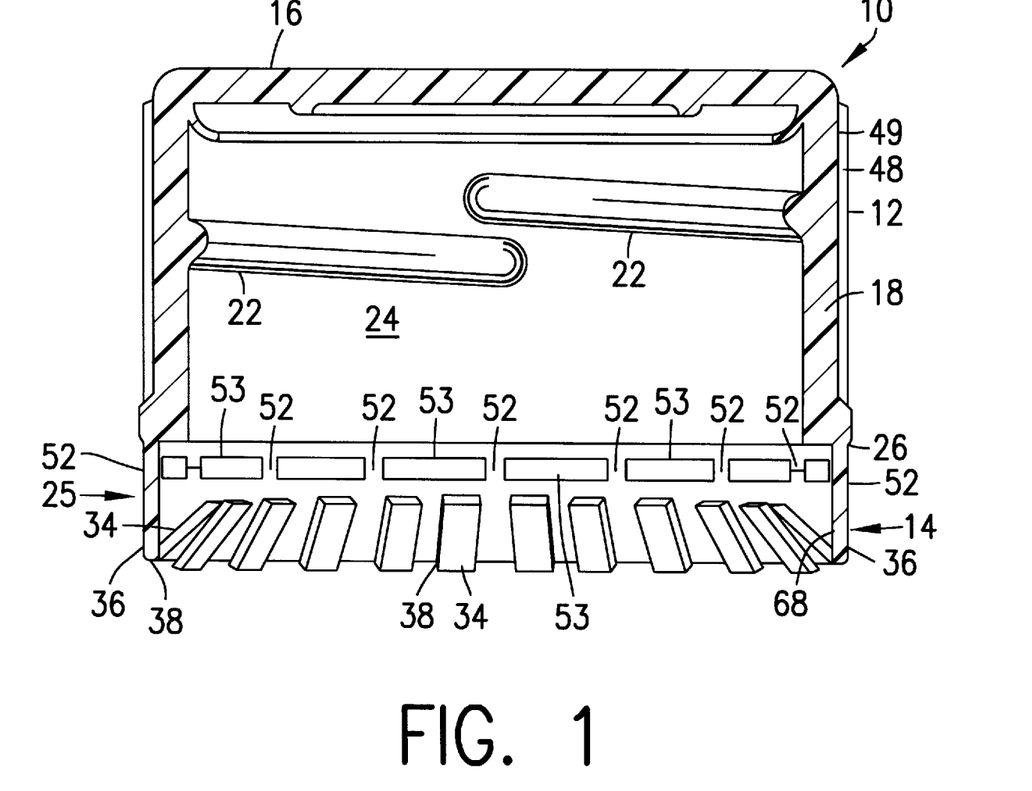
FIG. 1 illustrates a cross-sectional view of a tamper-evident closure having a plurality of tabs that point radially inward and upward from a cylindrical portion of the closure.

The tamper-evident closure 10 of FIG. 1 includes an internally threaded cap 12 and a tamper-indicating assembly 14 including a band or ring 36 detachably connected to the cap. The closure 10, which may be manufactured of a moldable plastic material such as polypropylene includes a top wall 16, otherwise referred to as a sealing surface, for extending across the open top of a container and an annular skirt or sidewall 18 integrally joined to the top wall 16 about the periphery of the top wall 16 and having a screw thread 22 formed on its inner surface 24 for engagement with a threaded container neck. The cap 12 is connected to assembly 14 by a weakened area, referred to as breakable connector means 25, in the ring 36. The breakable connector means 25 provides a severing plane normal to the closure and container axis at which the ring 36 will consistently detach from cap 12 when the closure 10 is first unscrewed. When the cap 12 is unscrewed from the container neck, the tamper-indicating assembly 14 is retained on the container neck by an annular container shoulder 28 so that continued upward motion of the cap 12 breaks the assembly 14 away from the cap 12 (See FIGS. 2–3). Those skilled in the art will understand that the direction referred to as "upward" in this application refers to a direction along the axis of a closure from the tamper-indicating assembly 14 toward the top wall 16 of the closure while downward refers to the opposite direction.

As described above, after the cap 12 has been removed from the container, the ring 36 of the tamper-indicating assembly 14 drops down on the container finish 27 so that if the cap 12 is subsequently replaced on the container, the gap between the cap and the tamper-indicating assembly 14 serves as a visual indication that the cap has been previously removed.

Figure 2:
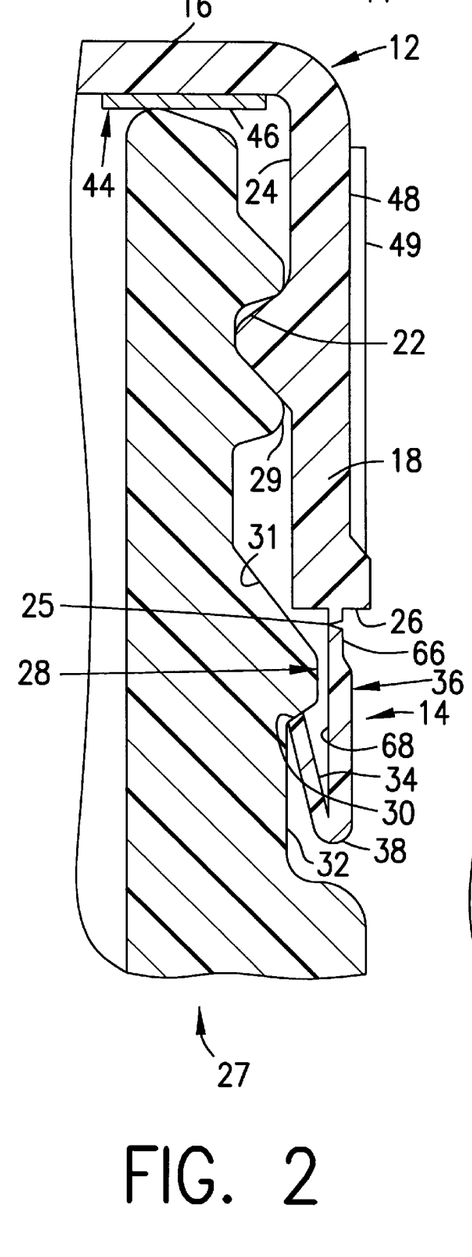
FIG. 2 illustrates a cross-sectional view of the tamper-evident closure of FIG. 1 with its tabs engaged to a container beneath an annular shoulder of the container.
Figure 3:
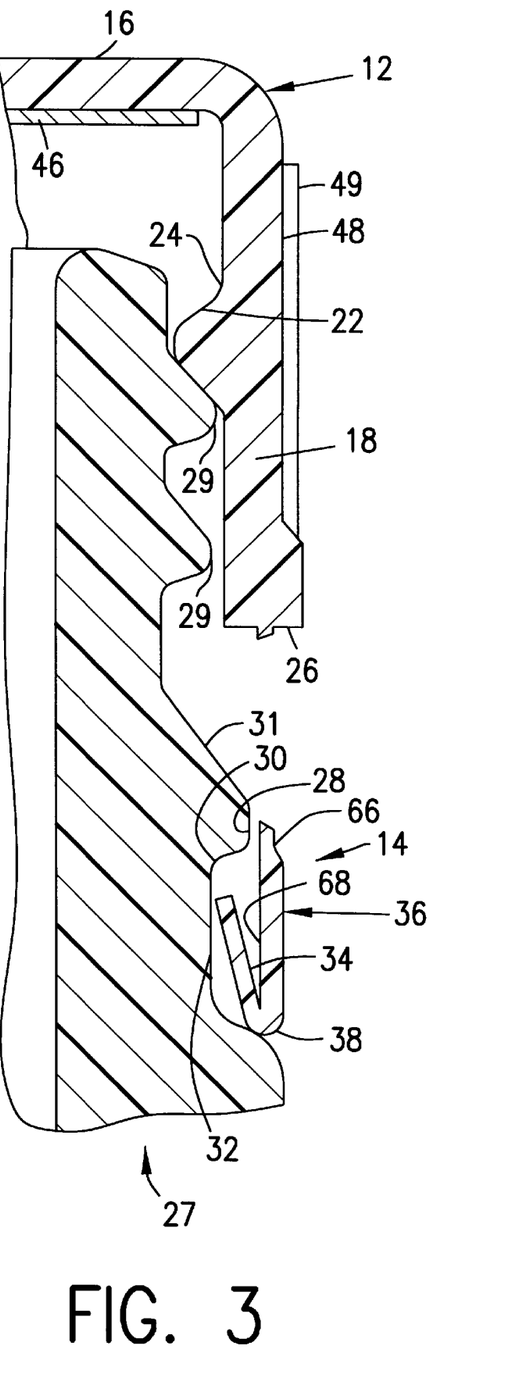
FIG. 3 illustrates a cross-sectional view of the closure of FIG. 1 engaged to the container after the cap portion of the closure is detached from the tamper-indicating assembly of the closure.

As illustrated in FIGS. 2–3, the container has a finish 27 with an annular shoulder 28 having an outer diameter that is larger than the diameter of the threads 29 of the container neck. The top surface 31 of the shoulder 28 is sloped downwardly and outwardly while a lower surface 30 of the shoulder 28 is tapered slightly upwardly and outwardly to provide a stop surface to limit the upward movement of the lower ring 36 to detach the ring 36 from the cap 12 when the cap 12 is unscrewed from the container neck. A neck surface 32 below the shoulder 28 has a diameter smaller than that of the shoulder 28. This difference in diameter between the neck surface and the outer shoulder diameter may be varied substantially. Herein, the neck surface 32 is illustrated as being substantially parallel to the axis of the closure. To assist in allowing the ring 36 to drop down to the position shown in FIG. 3, the neck surface 32 may be made to taper downwardly and inwardly to provide a smaller diameter at the lower end of the neck surface 32 than at the top end of the neck surface 32.

The tamper-evident closure 10 of FIG. 1 is provided with pivotal, resilient tabs 34 which, during removal of the cap 12, lock against the lower surface 30 of the annular shoulder 28 to retain the tamper-indicating assembly 14 on the container neck. The tabs 34 are preferably formed integrally with the ring 36 and preferably extend radially inward and upward from the generally cylindrical ring 36. These tabs 34 are resiliently urged against the finish 27 as they are flexed inwardly at curved ends or joints 38 where they meet the ring 36. As the cap 12 is removed, the upward force on the tamper-indicating assembly 14 tends to bow the tabs 34 inwardly against the neck surface 32 and to stiffen the tabs to cause them to engage more tightly and to grip the container neck. The closure 10 may be installed simply by screwing it downwardly onto the container neck so that the tabs 34 assist in guiding the closure 10 as it is lowered onto the container neck for installation. That is, the tabs 34 serve as a cam guiding surface of large diameter at their lower ends to center the cap 12 onto the container finish 27. Because the tabs 34 are so flexible they can readily be bent when the container and closure 10 are not axially aligned on the same vertical axis. Also during installation on a closure, the tabs 34 readily flex past large diameter tolerances on the closure finish.

Previous molding processes that have been used to manufacture tamper-evident closures such as the one illustrated in FIGS. 1–3 are not capable of molding tabs 34 in their final inward and upward folded positions. Instead, these conventional molding processes produce closures having tabs that point straight down in an unbent fashion. In order to obtain the tab configuration of FIGS. 1–3, the closure 10 is removed from the conventional molding apparatus, and a post-forming operation is implemented to bend tabs 34 radially inward and upward from the tamper-indicating assembly 14. Heat is then applied to the tab joints 38 to set the tabs 34 in the configuration of FIGS. 1–3. This post-forming step for bending tabs 34 introduces additional costs and prolongs the duration of the overall manufacturing process. Additionally, this type of post-forming step adds unwanted variability to the manufacturing process, and, as a consequence, the tamper-evident closures produced by this process are not as consistent with each other as would be desired. Accordingly, a need exists for a process of manufacturing a tamper-evident closure that avoids the extra expense and time expended by the post-forming step of bending and setting the closure tabs in their radially inward and upward position.

SUMMARY OF THE INVENTION

The present invention is directed to a method and apparatus for manufacturing a tamper-evident closure having a cap portion, a cylindrical portion serving as a tamper-indicating assembly and depending from the cap portion, and a plurality of tabs depending from the tamper-indicating assembly and extending radially inward and upward from the tamper-indicating assembly.

The method according to the present invention includes the steps of providing a female mold having an annular recess and temporarily inserting a male mold core portion into the annular recess of the female mold so that a first predetermined separation is maintained between an outer surface of the male mold core portion and an inner surface of the annular recess of the female mold to form a mold cavity for molding the tamper-evident closure. A tab forming portion of this mold cavity extends radially toward a longitudinal axis of the mold cavity and toward a sealing surface forming portion of the male mold core portion at the predetermined angle of inclination. Then a molding material is provided into the mold cavity and the first predetermined separation between the female mold and the male mold core portion is maintained for a predetermined duration until the molding material hardens into the form of the tamper-evident closure. The female mold is then separated from the male mold core portion and the molded tamper-evident closure is removed from the male mold core portion, while temporarily changing the predetermined angle of inclination of the plurality of tabs. Thereafter, the plurality of tabs are urged against the sealing portion forming surface of the male mold core portion to bend the plurality of tabs to substantially the predetermined angle of inclination.

An apparatus for molding such a tamper-evident closure according to the present invention includes a female mold having an annular recess and a male mold core portion for insertion into the annular recess of the female mold, wherein when an outer surface of the male mold core portion is maintained at a first predetermined separation from an inner surface of the annular recess of the female mold, a space between the outer surface of the male mold core portion and the inner surface of the annular recess of the female mold forms a mold cavity for forming the tamper-evident closure. This mold cavity includes a tab forming recess extending from a cylindrical portion forming part of the mold cavity toward the longitudinal axis and toward the sealing surface forming portion of the male mold core portion. An ejector pin is provided for removing the tamper-evident closure longitudinally from the male mold core portion so that, during removal of tamper-evident closures from the male mold core portion, the predetermined angle of inclination of the plurality of tabs is temporarily altered. After removing the tamper-evident closures from the male mold core portion, the stripper device brings the plurality of tabs into contact with the sealing surface forming portion of the male mold core portion to return the plurality of tabs to the predetermined angle of inclination. An injection port is provided for supplying molding material into the mold cavity.

DETAILED DESCRIPTION

Figure 4:
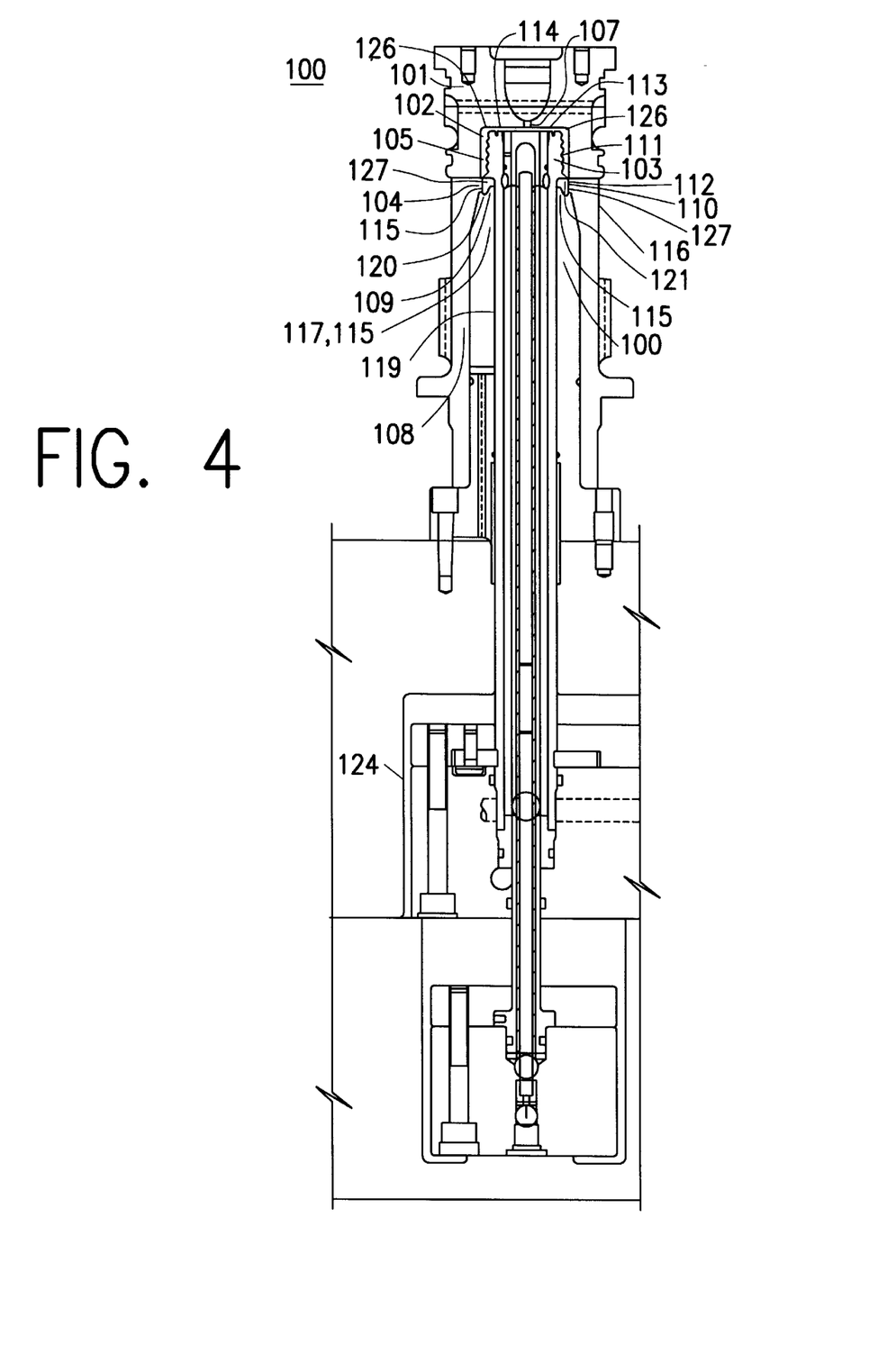
FIG. 4 illustrates a cross-sectional view of molding apparatus according to the present invention.

FIGS. 4–11 illustrate a cross section of a molding apparatus 100 for manufacturing a tamper-evident closure 10 that is provided with a plurality of tabs 34 extending radially upward and inward from a tamper-evident indicating assembly 14 of the closure 10. Although for the sake of simplicity the present discussion focuses on the capability of molding apparatus 100 to manufacture the tamper-evident closure 10 of FIGS. 1–3, it is to be understood that the present invention has the ability of being modified to produce other types of tamper-evident closures having tabs that are to be formed in various configurations. FIG. 4 illustrates the molding apparatus 100 in the mold closed position, in which the apparatus 100 is configured to receive from an injection port 107 molten plastic material into a mold cavity 105. The mold cavity 105 is formed by a male mold including a movable mold core portion 103 a tab forming element 104, a stationary mold core portion 106, and a stripping ring 108 in cooperation with a female mold 101. The female mold 101 includes an annular recess, the inner surface of which comprises a mold surface 102 for forming an outer surface of the top wall 16 and an outer surface of the sidewall 18 of the tamper-evident closure 10. Element 103 is referred to as a movable mold core portion because, as shall be explained later, core portion 103 may be moved along a longitudinal axis of the apparatus 100. The movable mold core portion 103 has an externally threaded side outer surface 111 for forming the internal threads of the inner surface of the sidewall 18 of the closure 10. The top outer surface 114 of the movable core portion 103 may also include a plurality of cylindrical vertical cavities 113 for forming from the molten plastic material a corresponding plurality of projections extending down from the inner surface of the top wall 16 of the tamper-evident closure 10. These projections act to hold dispensing fitments or liner assemblies until a closure application to a bottle is completed, whereby the dispensing fitment is transferred to the bottle. In other tamper-evident closures that are manufactured according to the present invention, such projections formed by cavities 113 are not necessary and can be omitted. The movable mold core portion 103 further includes a bore that has two open ends and that is substantially axially aligned with the longitudinal axis of the apparatus 100. This bore receives a hollow piston 122 that slidably engages the inner surface of the bore.

In the mold closed position, the outer surface of the movable mold core portion 103 is maintained at a predetermined distance from the inner surface of the annular recess of the female mold 101 so that the space between the outer surface of the movable mold core portion 103 and the inner surface of the annular recess of the female mold 101 forms a cap portion mold cavity 126, which is a part of the mold cavity 105. In the mold closed position of the apparatus 100, the top of hollow piston 122 is aligned to be at the same height as the top surface of the movable mold core portion 103. When the molding material, usually molten plastic, is injected into the mold cavity 105, the top surface 114 of the movable mold core portion 103, in cooperation with the top of the hollow piston 122, forms the top wall 16 of the closure 10.

A tab forming element 104 is disposed along an outer periphery of a bottom surface of the movable mold core portion 103. The tab forming element 104 includes a vertical mold surface 112 that, in cooperation with an inner surface 115 of an annular shoulder 116 of the stripper ring 108, forms the ring 36 (or tamper-indicating assembly 14) of the tamper-evident closure 10. In the mold closed position, the inner surface 115 of the annular shoulder 116 of the stripper ring 108 is maintained at a predetermined distance from the vertical mold surface 112 of the tab forming element 104 so that the space between the inner surface 115 and the vertical mold surface 112 forms a tamper-indicating assembly mold cavity 127, which is a part of the mold cavity 105. Tab forming element 104 may comprise a separate element that is joined to the mold core portion 103, or instead, tab forming element 104 may be integrated with the movable mold core portion 103.

A tab mold cavity 109 which molds the tabs 34 of the closure 10 in their final, radially upward and inward position is formed by the cooperation of an inclined bottom mold surface 110 of the tab forming element 104 and a top inclined mold surface 125 of stationary core portion 106. The angle of inclination of surfaces 110 and 125 can be configured to any desired inclination, and this angle of inclination corresponds to the degree to which the tabs 34 extend radially upward and inward from the tamper-indicating assembly 14 of closure 10. In addition, the angle of inclination of surfaces 110 and 125, relative to one another, may be varied to create tabs which vary in thickness along their length. Both tab forming element 104 and stationary core portion 106 include axially aligned annular lip portions 117, 118 that, when the apparatus 100 is in the mold closed position, are in direct contact with each other and hence do not form part of the tab mold cavity 109. The apparatus of the present invention can accommodate different replaceable mold core portions and accompanying tab forming elements capable of molding tabs of varying inclinations.

Figure 5:
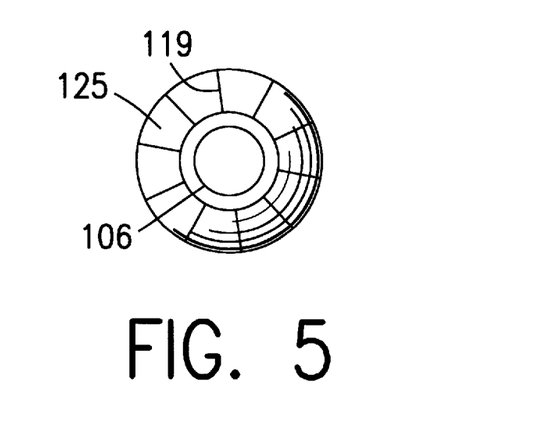
FIG. 5 illustrates a top surface view of a stationary core portion of the molding apparatus according to the present invention.

FIG. 5 illustrates stationary mold core portion 106 from a top view, omitting the other elements of apparatus 100. The top inclined surface 125 of stationary core portion 106 preferably includes a plurality of evenly spaced apart protrusions 119, that, when apparatus 100 is in the mold closed position, extend up to contact the lower inclined surface 110 of tab forming element 104. Referring back to FIG. 4, after molten plastic material is introduced into mold cavity 105, the molten plastic material flows into tab mold cavity 109 through an annular gap 120 formed between a lower edge 121 of tab forming element 104 and the bottom of the top inclined surface 125 of the stationary core portion 106. Molten plastic material that flows into tab mold cavity 109 fills the gaps between the protrusions 119. The molten plastic deposited between these protrusions 119 hardens into separate tabs 34 illustrated in FIG. 1. Moreover, the molten plastic that solidifies at gap 120 corresponds to the joints 38 at which tabs 34 are attached to ring 36 of closure 10.

As stated before, movable mold core portion 103 includes an axially aligned bore having two open ends for receiving the hollow piston 122. The hollow cavity of piston 122 includes a cooling channel 123 for receiving a cooling fluid, such as water, so that the mold core portion 103, 104, 106 and the molded closure can be rapidly cooled.

In order to form the closure 10, the apparatus is set to the mold closed position. Molding material is then introduced in mold cavity 105 by injection port 107. When the molding material has hardened sufficiently a blank having an internally threaded cap 12, a cylindrical tamper-indicating assembly 14, and a plurality of tabs extending radially inward and upward from the assembly 14 is ready. As illustrated in FIG. 4, the tabs 34 extend in their final molded position radially inward and upward from the tamper-indicating assembly 14. The following diagrams in FIGS. 6–12 illustrate the various operations that the apparatus 100 performs in order to eject closure 100 from the mold cavity 105 while preserving the desired molded tab configuration shown in FIG. 4.

Figure 6:
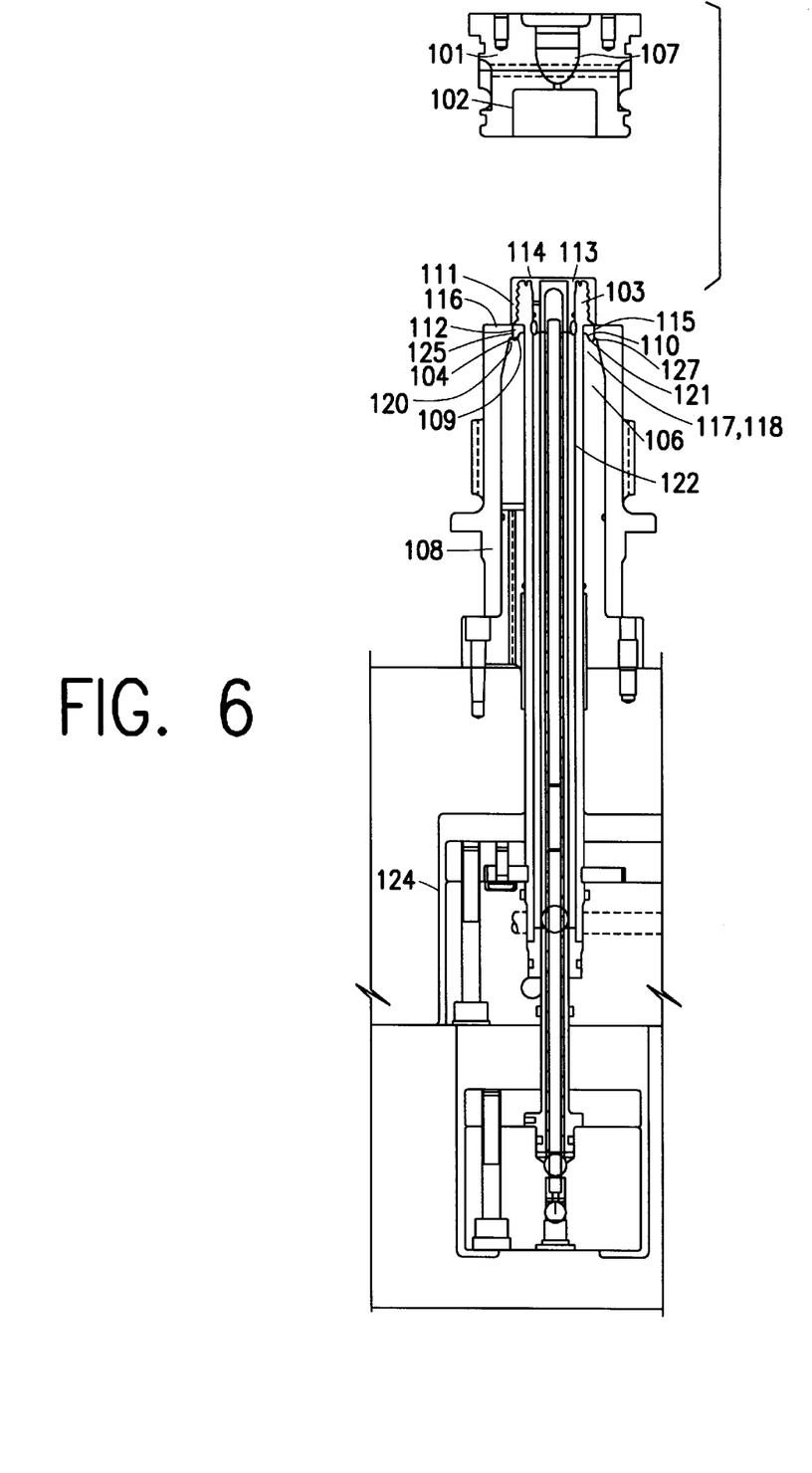
FIG. 6 illustrates a configuration of the molding apparatus according to the present invention in which a female mold is removed from the molding apparatus.

In FIG. 6, after the closure 10 has solidified but not necessarily cooled completely, female mold 101 is lifted away from the movable mold core portion 103 of the male mold. This operation exposes the top wall 16 and the sidewall 18 of closure 10.

Figure 7:
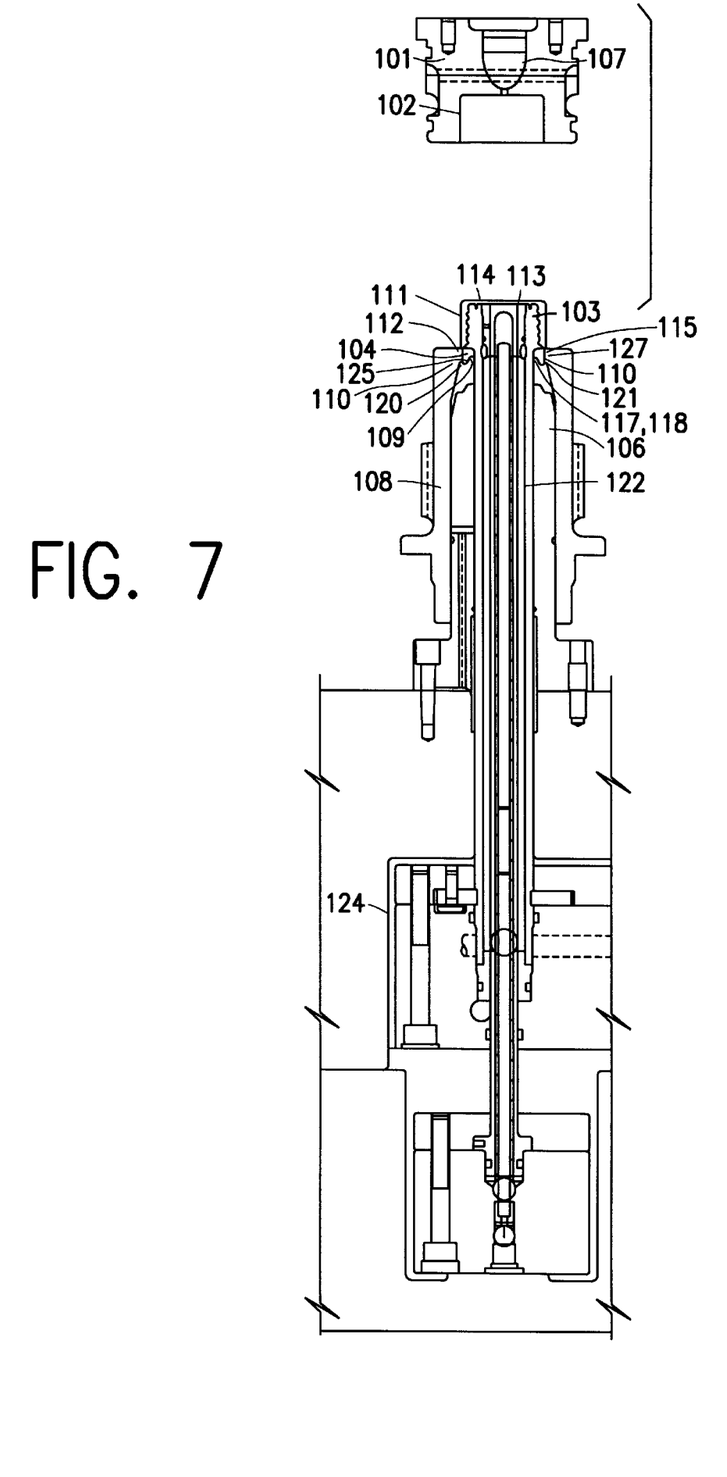
FIG. 7 illustrates the raising of a movable core portion of the molding apparatus according to the present invention.

FIG. 7 illustrates the raising of movable core portion 103 along a longitudinal axis of apparatus 100 for a predetermined distance away from the stationary core portion 106. The raising operation is accomplished by motive means 124. Motive means 124 causes hollow piston 122 to move in an upward direction for a predetermined distance, and since movable mold core 103 is engaged to the hollow piston 122, movable core portion 103 also moves upward for the same predetermined distance. Stripper ring 108 remains during this operation attached to the tamper-indicating assembly 14 of closure 10. Consequently, stripper ring 108 is also raised along the longitudinal axis of the apparatus 100 for the same predetermined distance as the movable mold core portion 103. As a result of this operation, a gap 125 is created between tab forming element 104 and the top of stationary mold core portion 106.

Figure 8:
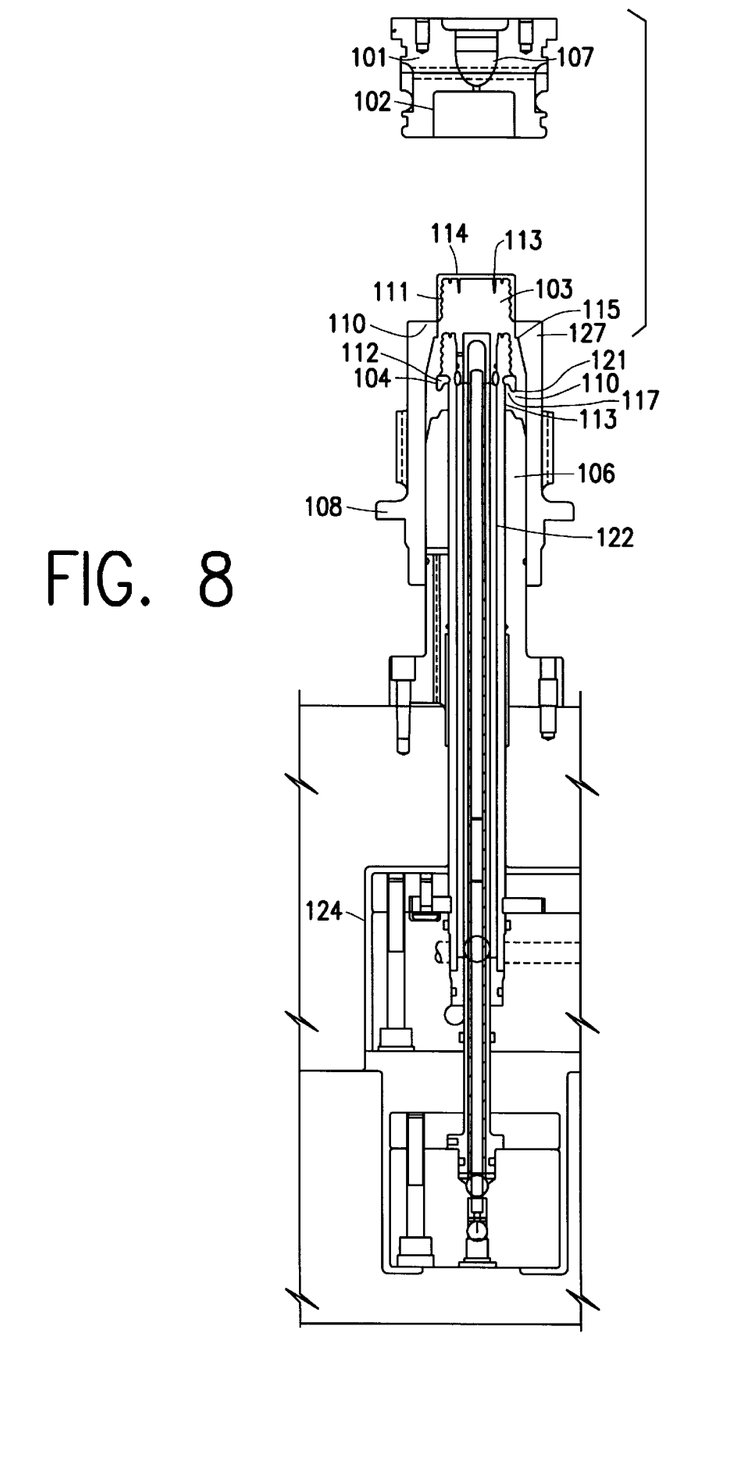
FIG. 8 illustrates the unscrewing of a molded closure from the movable core portion of the molding apparatus of the present invention.

FIG. 8 illustrates the unscrewing of the closure 10 from the movable mold core portion 103. After the movable mold core portion 103 has been configured into the positioning of FIG. 7, the stripper ring 108 rotates about the longitudinal axis of apparatus 100, and at the same time, stripper ring 108 moves in an upward direction along the longitudinal axis of apparatus 100 and away from movable mold core portion 103. The stripper ring 108 is rotated and moved in a conventional manner by elements that have not been illustrated for the sake of simplicity. Since the inner surface of the shoulder 116 of the stripper ring 108 remains attached to the tamper-indicating assembly 14 of the closure 10, the rotation of the stripper ring 108 causes the closure 10 to be unscrewed from the movable mold core portion 103. As closure 10 moves away from the movable mold core portion 103, the vertical sidewall of the movable mold core portion urges the tabs 34 to temporarily point down in an alignment substantially parallel to the longitudinal axis of the apparatus 100.

Figure 9:
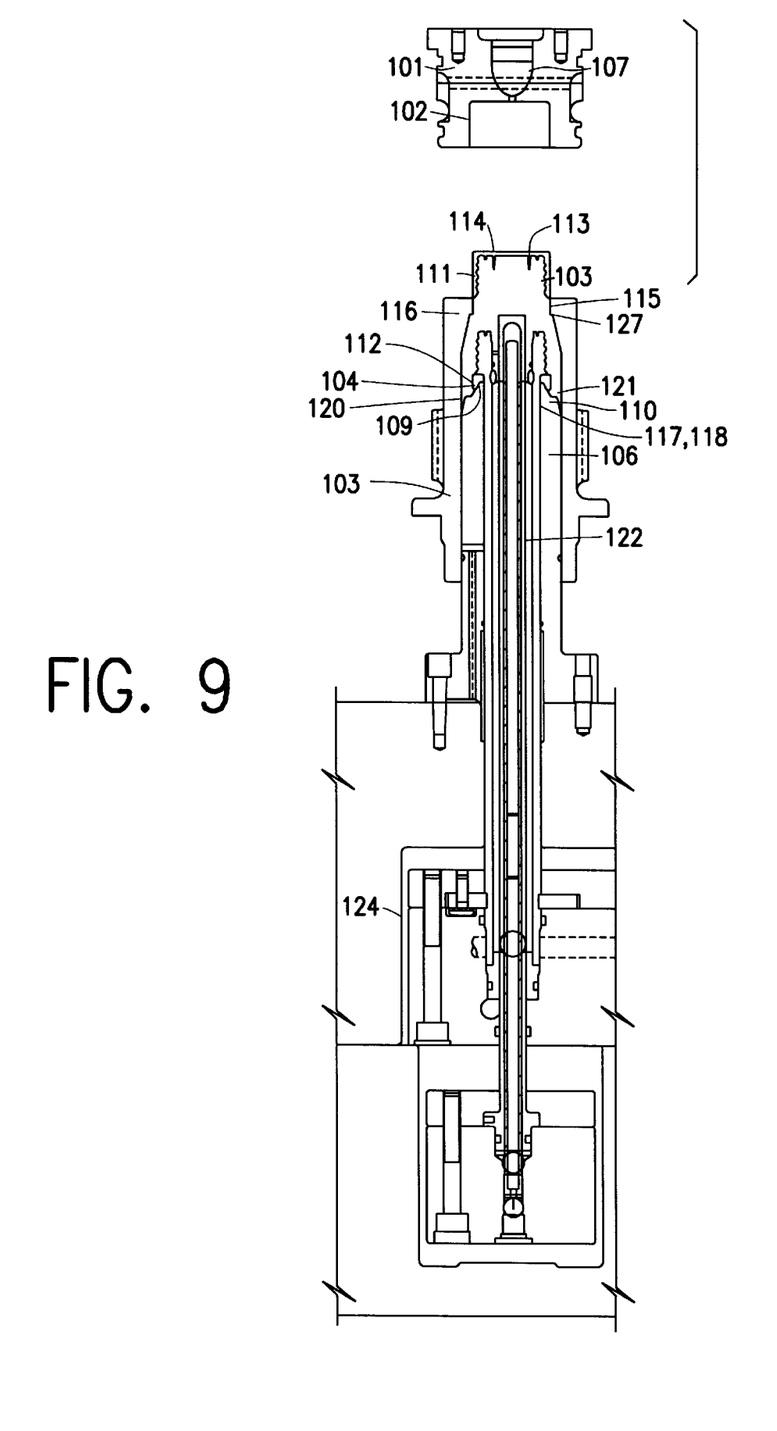
FIG. 9 illustrates the retraction of the movable mold core portion of the molding apparatus of the present invention.

In FIG. 9, after the closure 10 is unscrewed from the movable mold core portion 103, motive means 124 retracts the movable mold core portion 103 to its original longitudinal position illustrated in FIG. 4. At this point, the movable mold core portion 103 is no longer in contact with any portion of the closure 10. As a result of this retraction of the movable mold core portion 103, the tabs 34 are no longer urged into a vertical alignment by the sidewall of the movable mold core portion 103. Consequently, because the tabs 34 are formed of a resilient plastic material, the tabs flex inward to a position that is intermediate between the vertical position of FIG. 8 and the inward and upward molded position of FIG. 4. In this intermediate position, the tabs 34 bend inwardly to some extent, but they do not necessarily bend upwardly to the same extent as they did in FIG. 4 because the straightening of the tabs that occurs in FIG. 8 reduces to some extent the resiliency of the tabs 34 to bend back to their original molded position.

Figure 10:
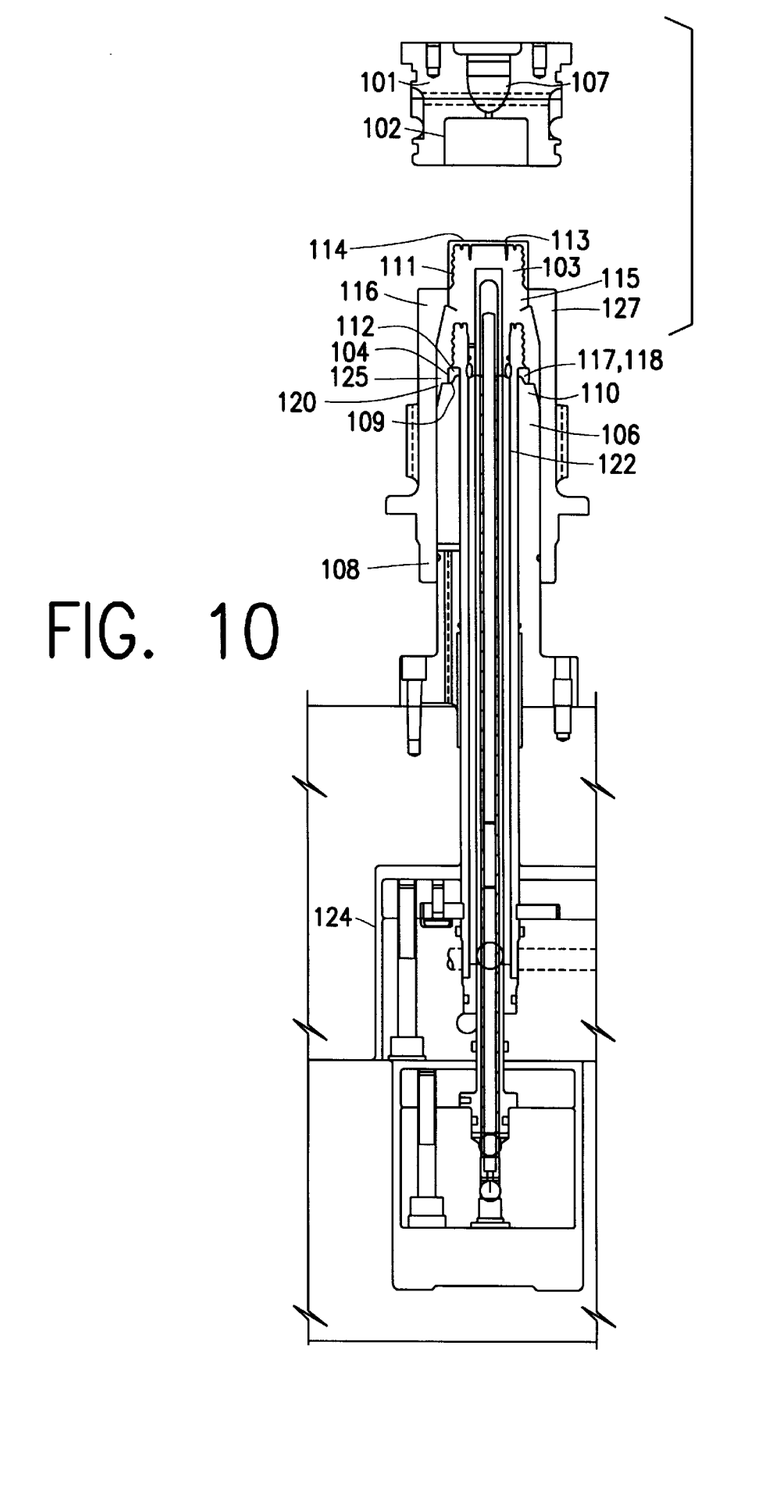
FIG. 10 illustrates the extension of an ejector pin through an axially aligned bore of the movable mold core portion.
Figure 11:
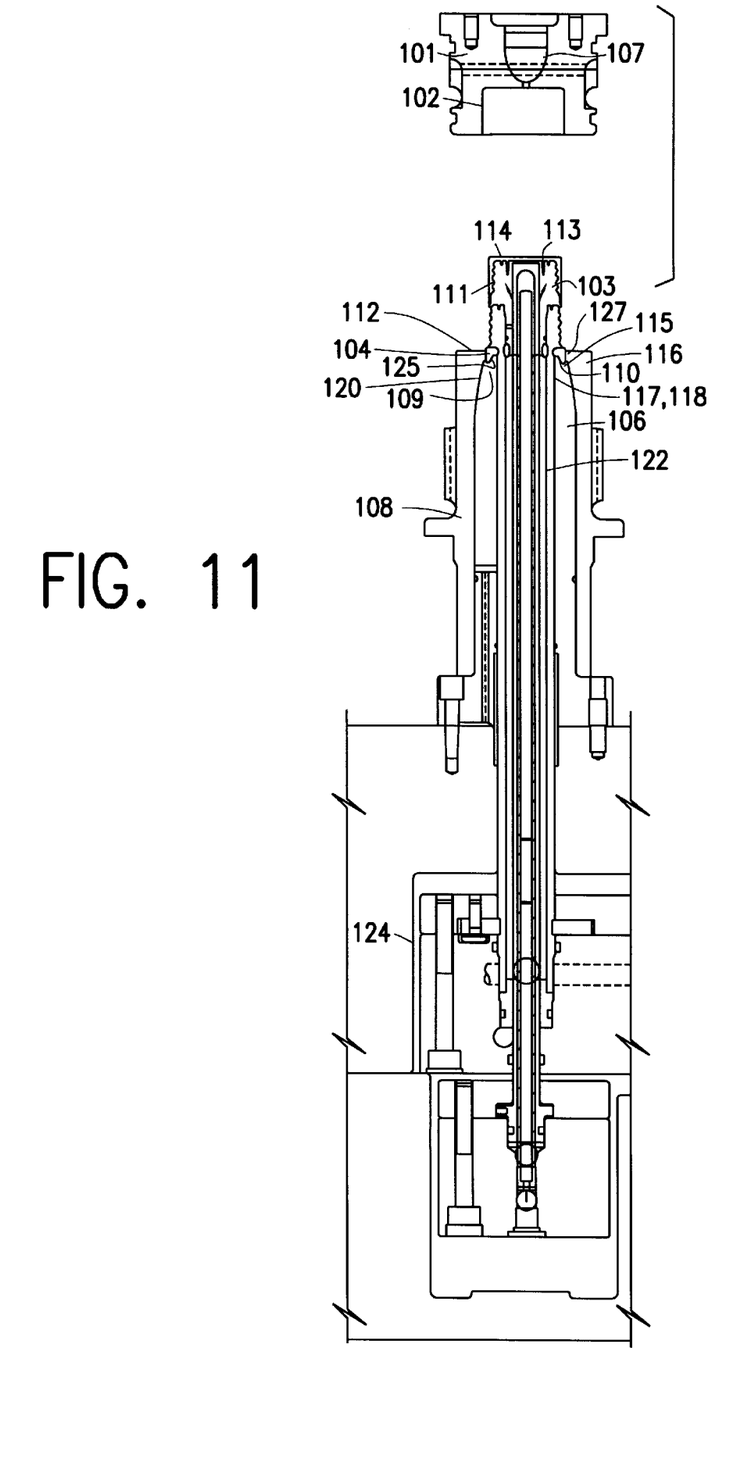
FIG. 11 illustrates the urging of the tabs of the molded closure against a top edge of the movable mold core portion.

In FIG. 10, an ejector pin 126 of the hollow piston 122 is moved through the bore of the movable mold core portion 103. The ejector pin 126 ejects the closure 10 out of the stripper ring 108. Alternatively, as shall be explained with respect to FIG. 11, a stream of air may be expelled through the top of hollow piston 122 in order to eject the closure 10 from the stripper ring 108.

Figure 12:
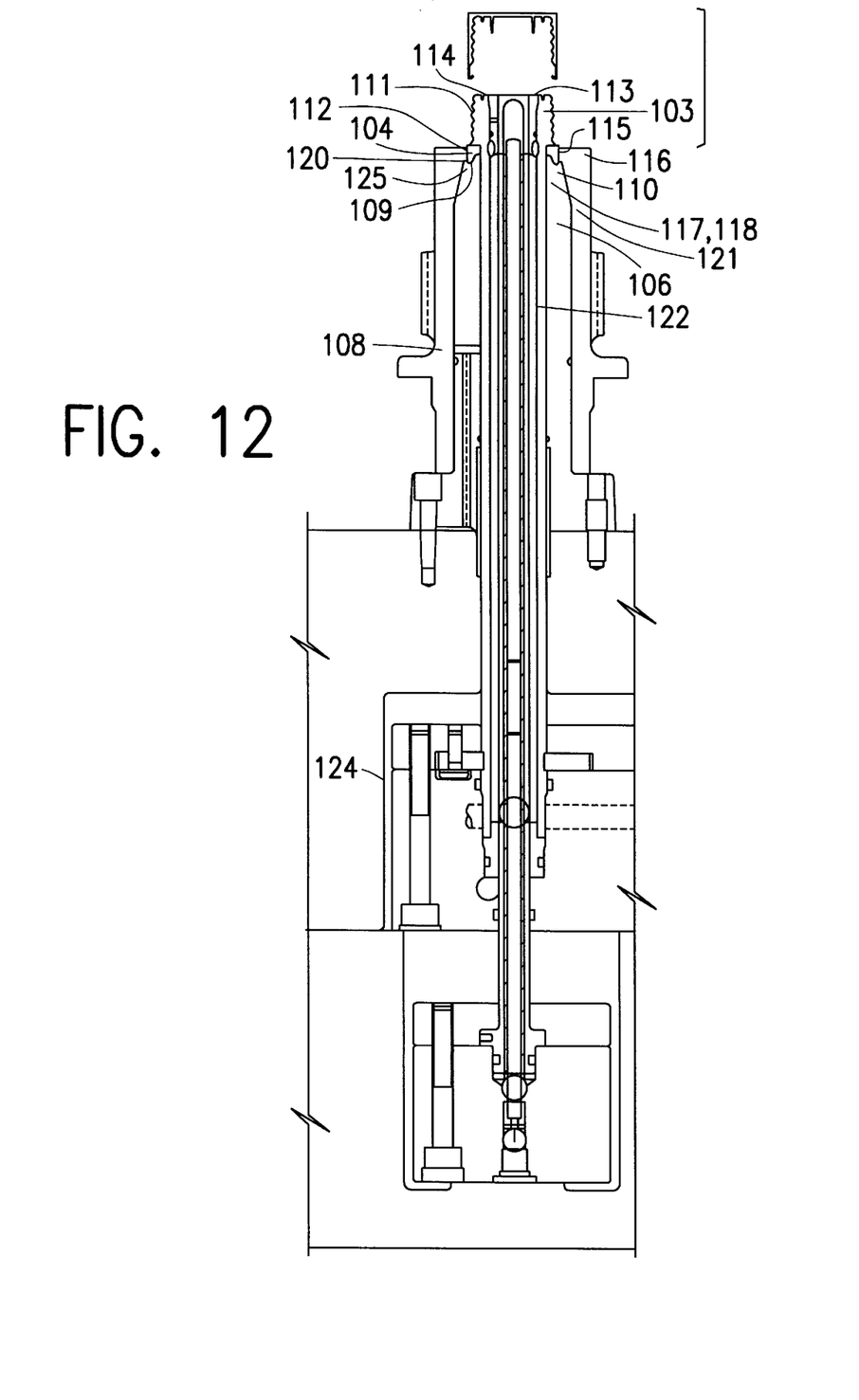
FIG. 12 illustrates the removal of the molded closure from the molding apparatus of the present invention.

As noted with respect to FIG. 9, the tabs 34 of the closure 10 bend radially inward but are not usually going to be at the predetermined angle of inclination after the mold core portion 103 has been retracted. As explained with respect to FIG. 2, the tabs 34 should point radially upward as well as inward so that the tabs can be urged against the lower surface 30 of the annular shoulder 28 of the container when the cap 12 of the closure 12 is unscrewed from the container. According to FIG. 11, in order for the tabs 34 to regain this configuration, the stripper ring 108 is fully retracted to the same position the stripper ring 108 exhibited in FIG. 4. Since the stripping ring 108 is still attached to the tamper-indicating assembly 14 of the closure 10, the retraction of the stripper ring 108 lowers the tabs 34 of the closure 10 against the top edge of movable mold core portion 103 bringing the tabs 34 into contact with the top edge of mold core portion 103 to urge the tabs 34 back into substantially their original molded position, although the inclination of the tabs at this point may differ to a nominal extent from the inclination exhibited by the tabs in Fig.4. This possible nominal difference in inclination is largely due to the dynamics of the molding process itself. As the top of stripper ring 108 is moved further down the longitudinal axis of the apparatus 100, the closure 10 separates from the stripper ring 108 and comes to rest on top of the movable mold core portion 103. After the closure 10 comes to rest on top of movable mold core portion 103, a stream of air is expelled from the piston 122 (as seen in FIG. 12). The air is expelled when the ejector pin has regained the full forward position as in FIG. 10. The stream of air ejects the closure 10 off of movable mold core portion 103 and to a nearby collection bin or other suitable receptacle. Thus, the present invention is capable of manufacturing a closure having tabs that extend radially inward and upward from a tamper-indicating assembly of the closure without relying on an additional post-forming step in order to bend and set the tabs into this desired configuration.

Those skilled in the art will understand that there are many modifications which may be made to the disclosed embodiments without departing from the teachings of the invention and these modifications are considered to be within the scope of this invention which is intended to be limited only by the claims appended hereto.

What is claimed is:

1. A method of manufacturing a tamper-evident closure having a cap portion, a cylindrical portion depending from the cap portion, and a plurality of tabs depending from the cylindrical portion and extending radially toward a longitudinal axis of the cylindrical portion and toward a sealing surface of the cap portion at a predetermined angle of inclination, comprising the steps of:

a) providing a female mold having an annular recess;
b) temporarily inserting a male mold core portion into the annular recess of the female mold so that a first predetermined separation is maintained between an outer surface of the male mold core portion and an inner surface of the annular recess of the female mold, so that a space between the inner surface of the annular recess of the female mold and the outer surface of the male mold core portion forms a mold cavity for molding the tamper-evident closure, wherein a tab forming portion of the mold cavity extends radially toward a longitudinal axis of the mold cavity and toward a sealing surface forming portion of the male mold core portion at the predetermined angle of inclination;
c) providing a molding material into the mold cavity;
d) maintaining the first predetermined separation between the female mold and the male mold core portion for a predetermined duration until the molding material hardens into the form of the tamper-evident closure;
e) separating the female mold from the male mold core portion;
f) removing the molded tamper-evident closure from the male mold core portion, wherein during the step of removing the molded tamper-evident closure from the male mold core portion, the predetermined angle of inclination of the plurality of tabs is temporarily changed; and
g) thereafter, urging the plurality of tabs against the sealing portion forming surface of the male mold core portion to bend the plurality of tabs to substantially the predetermined angle of inclination.

2. The method according to claim 1, wherein the male mold core portion includes a first portion and a second portion movable with respect to the first portion and wherein the tab forming portion of the mold cavity is formed between a second tab molding surface of the second portion and a first tab molding surface of the first portion.

3. The method according to claim 2, wherein the male mold core portion includes a cylindrical portion molding, the method further comprising, after the step b), the step of positioning a surface of a stripper ring at a third predetermined separation from the cylindrical portion molding surface, wherein a space between the surface of the stripper ring and the cylindrical portion molding surface defines a cylindrical portion recess of the mold cavity for forming the cylindrical portion of the tamper-evident closure.

4. The method according to claim 3, further comprising, after the step e), the step of separating the first portion and the stripper ring from the tab forming surface of the second portion.

5. The method according to claim 4, wherein the step e) of separating the first portion and the stripper ring from the second portion comprises moving, for a predetermined longitudinal distance along the longitudinal axis of the mold cavity, a piston coupled to the first portion and the stripper ring.

6. The method according to claim 3, further comprising, after the step g), the step of removing the tamper-evident closure from the sealing surface forming portion of the male mold core portion.

7. The method according to claim 6, wherein the step of removing the tamper-evident closure from the sealing surface forming portion of the male mold core portion comprises providing a stream of air through an opening in the sealing surface forming portion of the male mold cavity.

8. The method according to claim 7, wherein the step of providing a stream of air comprises moving a piston through a bore formed through the male mold core portion.

9. The method according to claim 3, wherein the step f) of removing the tamper-evident closure from the male mold core portion comprises:

rotating the stripper ring about the longitudinal axis to rotate the tamper-evident closure about the male mold core portion; and moving the stripper ring along the longitudinal axis of the male mold core portion and away from the male mold core portion, so that during the rotation and longitudinal movement of the stripper ring, the surface of the stripper ring remains attached to the cylindrical portion of the tamper-evident closure, and wherein the rotation and longitudinal movement of the stripper ring causes the surface of the annular shoulder of the stripper ring to unscrew the tamper-evident closure from an externally threaded sidewall surface of the male mold core portion.

10. The method according to claim 9, wherein the step g) of urging the plurality of tabs against the sealing surface forming portion of the male mold core portion comprises moving the stripper ring towards the sealing surface forming portion of the male mold core portion along the longitudinal axis, and wherein during the step g) of urging the plurality of tabs against the sealing surface forming portion of the male mold core portion, the surface of the stripper ring remains attached to the cylindrical portion of the tamper-evident closure.

11. The method according to claim 10, wherein the surface of the stripper ring becomes detached from the cylindrical portion of the tamper-evident closure after the plurality of tabs of the tamper-evident closure are urged back to substantially the predetermined angle of inclination so that the tamper-evident closure remains at rest on the sealing surface forming portion of the male mold core portion.

12. The method according to claim 1, wherein during the step f) of removing the tamper-evident closure from the male mold core portion, the plurality of tabs of the tamper-evident closure are urged against a sidewall of the male mold core portion into a configuration substantially parallel to a longitudinal axis of the male mold core portion.

* * * * *